United States Patent [19]

Garnish et al.

[11] 3,784,433

[45] Jan. 8, 1974

[54] REINFORCED COMPOSITES

[75] Inventors: Edward William Garnish, Saffron Walden; Barry James Hayes, Little Eversden, both of England

[73] Assignee: Ciba-Geigy AG, Basel, Switzerland

[22] Filed: Mar. 30, 1972

[21] Appl. No.: 239,765

Related U.S. Application Data

[63] Continuation-in-part of Ser. No. 2,441, Jan. 12, 1970, abandoned.

[30] Foreign Application Priority Data

Jan. 17, 1969 Great Britain .................. 2880/69

[52] U.S. Cl.................. 156/276, 156/60, 156/176, 156/330, 156/335, 161/176
[51] Int. Cl............................................. B32b 31/12
[58] Field of Search.................... 156/60, 176, 276, 156/330, 335; 161/176

[56] References Cited

UNITED STATES PATENTS 2,959,511  11/1960  Finser .............................. 156/60 X
3,150,792  9/1964  Bright ............................. 156/228 X Primary Examiner—Edward G. Whitby
Attorney—Joseph G. Kolodny et al.

[57] ABSTRACT

Composites of unidirectional carbon fibers and a thermosettable resin are made by applying the resin as a continuous solid film to the carbon fibers, applying heat and pressure so that the resin flows about the fibers and forms a coherent structure, and then converting the resin into its solid, fusible B-stage.

11 Claims, No Drawings

REINFORCED COMPOSITES

It is a continuation-in-part of our application Ser.No. 2,441 of Jan. 12, 1970, now abandoned.

This invention relates to the production of reinforced composites from thermosettable resins in film form and unidirectional carbon fibers.

Composite structures have been made by impregnating porous woven or nonwoven fabrics such as glasscloth or paper with a liquid resin and then allowing or causing the resin to solidify, such as by cooling, by evaporating solvent, or by curing the resin. However this technique is not well suited for making composites with unidirectional carbon fibers, particularly if the fibers are short, because the fibers become displaced and the reinforcing effect is then irregularly distributed. When the resin is solid at room temperature, to render it liquid a solvent must often be used, which is inconvenient and incurs additional expense. Sometimes the desired plastics material cannot be used because it cannot readily be brought into solution: or it may be liable to cure prematurely if kept molten. It has now been found that reinforced uncured plastics material composites can readily be made from unidirectional carbon fibers and a solid thermosettable resin in film form. The resin of the composite is then cured.

The method of the invention comprises applying a continuous solid film of a thermosettable resin composition to unidirectional carbon fibers, applying heat and pressure so that the resin composition flows about the fibers and the resin composition, and the fibers form a coherent structure, and converting the resin into its solid, fusible B-stage. When required, e.g., after the composite has been formed into some desired configuration, the resin may be converted into the fully cured, insoluble and infusible C-stage.

In the method of this invention the film of thermosettable resin composition is, when initially brought into contact with the carbon fibers, essentially a solid, and some, at least, of the difficulties in converting the resins into a liquid form are circumvented. Heating cycles can be very short as there is no solvent to evaporate, and the thin layers can be cooled quickly. A further advantage of the new method is that mixtures comprising particles of a thermoplastic resin dispersed in the thermosettable resin composition can be used: such multicomponent compositions are often tougher than homogeneous resin systems. The application of pressure, which is usually undesirable when liquid impregnating resins are used, is in the present case advantageous since unwanted movement of the carbon fibers relative to each other is restricted. A yet further advantage is that multi-element composites can be produced by employing films of different types on opposite faces of the carbon fibers and/or by employing additional types of reinforcement, e.g. foils of aluminum, steel, or titanium, or films of a plastics material such as nylon, a polyimide, a polysulfone, a polycarbonate, or of a natural or synthetic rubber (such as neoprene or an acrylonitrile rubber). Foils of aluminum, steel, or titanium on the outer faces of composites may protect the composites against erosion, for example, while films of a rubber or plastics material could also improve the resistance to erosion and to impact. Incorporation of a flexible film of a rubber or other plastics material between a rigid composite and a metal skin could help to relieve stresses generated by the different coefficients of expansion of the composite and the metal skin. Of course, decorative films and foils may also be used.

The film of thermosettable resin composition may be provided with a strippable backing sheet, e.g., of polythene or paper, on the face opposite to that brought into contact with the carbon fibers. Manipulation of the film-reinforcing material assembly is often easier if the film has tacky surfaces; these may be produced by coating the film with a substance which retains its tackiness during storage of the film at room temperature but which is cured to a hard, insoluble, infusible resin under conditions which will effect a cure of the thermosettable resin of the film. Films of thermosettable resin compositions, even those containing a thermoplastic resin which is not heat-curable, often possess, without additional treatment, an adequate degree of tackiness under the conditions employed for impregnating the unidirectional carbon fibers.

The composite may be made by a batch process, the unidirectional carbon fibers being laid on a continuous film of thermosettable resin composition, preferably under slight tension, a second such continuous film being laid on top of the fibers, and the assembly being pressed whilst being heated. Of course, multilayer strucrures may be formed by superimposing alternate layers of unidirectional carbon fibers and continuous films of thermosettable resin composition.

The composite structures may also be made continuously, such as by contacting the unidirectional carbon fibers, if necessary supported on the reverse by a strippable backing sheet, with the continuous film of thermosettable resin composition, then applying a second such continuous film to the reverse side of the fibers, first removing the strippable backing sheet, if used. More conveniently, two continuous films of thermosettable resin composition, which preferably are supported on the reverse by belts or strippable sheets, are applied simultaneously to each face of the unidirectional carbon fibers.

The thermosettable resin composition, which will include a curing agent, may contain a single thermosettable resin, such as an epoxide resin (i.e., a substance containing on average more than one 1,2-epoxide group per molecule) or a resole formed from a phenol such as phenol itself and an aldehyde such as formaldehyde; or it may contain a mixture of thermosettable resins. Preferably it also contains a thermoplastic resin which is not heat-curable. Examples of such compositions are resoles with, as the thermoplastic component, a poly(vinyl acetal) or a nylon; a novolac formed from a phenol such as phenol itself and formaldehyde or other aldehyde, with neoprene rubbers or acrylonitrile rubbers; and epoxide resins, with a phenoxy resin (i.e., a polyarylene polyhydroxy polyether, substantially free from 1,2-epoxide groups, being a copolymer of a dihydric phenol with either a diglycidyl ether of a dihydric phenol or with epichlorohydrin and containing recurring units represented by the formula

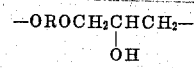

where R denotes an arylene group), a polysulfone (a substance containing recurring units represented by the formula $-RSO_2-$, where R has the meaning previously assigned), or a copolymer of an α-olefin hydrocarbon with an α-olefin which is an ester of a carboxylic acid. These compositions are made into film adhesives in a conventional manner.

The following Examples illustrate the invention. Parts are by weight.

EXAMPLE I

Films were prepared from an epoxide resin, a curing agent therefor, and a thermoplastic polysulfone which was not heat-curable.

A second film was placed on top; assemblies with films prepared from compositions b, c, d, e, f and h, were put in a press and heated at 155°C for 1 minute under a nominal pressure, while those with films prepared from the other compositions listed in Table I were passed through nip rollers heated to 80°C.

The composites were cured by heating for about 1 hour at 180°C.

Table I

| Component | Composition (parts) | | | | | | | | | |
|---|---|---|---|---|---|---|---|---|---|---|
| | a | b | c | d | e | f | g | h | i | j |
| Epoxide resin A | 100 | 100 | 100 | 100 | 100 | 100 | 100 | 100 | | |
| Epoxide resin B | | | | 40 | | | | | | |
| Epoxide resin C | | | | | 40 | | | | | |
| Epoxide resin D | | | | | | 10 | 20 | 40 | | |
| Epoxide resin E | | | | | | | | | 100 | 100 |
| Polysulfone A | 30 | 50 | 60 | 60 | 60 | 150 | 60 | 60 | 30 | 30 |
| Dicyandiamide | 10 | 10 | 10 | 15.5 | 16 | 12.5 | 15 | 20 | | |
| bis(4-Aminophenyl)methane | | | | | | | | | 30 | |
| bis(4-Aminophenyl)sulfone | | | | | | | | | | 40 |

The resins employed were as follows.

"Epoxide resin A" denotes a polyglycidyl ether prepared in a known manner from 2,2-bis(4-hydroxyphenyl)propane and epichlorohydrin in the presence of alkali, having an epoxide content in the range 5.0 – 5.2 equiv./kg. and a viscosity at 21°C in the range 200 – 400 poises.

"Epoxide resin B" denotes a polyglycidyl ether similarly prepared from resorcinol and epichlorohydrin, and having an epoxide content of 7.26 equiv./kg.

"Epoxide resin C" denotes a poly(N-glycidylamine) prepared in a known manner from bis(4-aminophenyl)methane and epichlorohydrin in the presence of alkali and having an epoxide content in the range 7.8 – 8.2 equiv./kg.

"Epoxide resin D" denotes vinylcyclohexene dioxide, having an epoxide content in the range 13 – 14 equiv./kg.

"Epoxide resin E" denotes a polyglycidyl ether prepared as indicated for "Epoxide resin A" and subsequently purified by crystallisation. It was semisolid at room temperature and had an epoxide content of approximately 5.7 equiv./kg.

"Polysulfone A" denotes a material available from Union Carbide Corporation under the designation Polysulfone P1700; according to the manufacturer, it melted in the range 350° to 370°C, its heat deflection temperature (ASTM Specification D648) was 175°C, and it contained, per average molecule, 50 to 80 repeating units of the formula

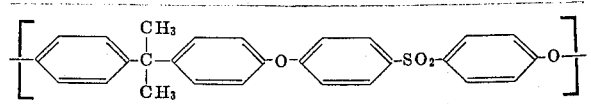

The compositions were prepared by dissolving the polysulfone in the epoxide resin or resins, heated to about 260°C, cooling to about 120°C, adding the curing agent and then pressing or casting the product into a film about 0.025 mm thick.

Table I shows the compositions employed.

Carbon fibers were held in place, essentially parallel to each other, on such a film by applying slight tension.

EXAMPLE II

A mixture comprising 100 parts of Epoxide resin A, 70 parts of Polysulfone A, and 10 parts of a chemically modified amine complex of boron trifluoride ( obtained from Anchor Chemical Co.Ltd., Clayton, Manchester, England, under the designation "Anchor Curing Agent 1040") was dissolved in 120 parts of methylene chloride, the solution was poured onto a release paper, and the coated paper was heated in an oven to remove solvent. The film remaining was 0.025 mm thick. The supported films were placed on either face of a mat of carbon fibers and the whole was heated at 100°C under a pressure of 3.5 kg/sq.cm for 1 minute. Curing was carried out by heating the composite for 1 hour at 150°C.

EXAMPLE III

A butadiene-acrylonitrile rubber (100 parts) obtained from B.P. Plastics Ltd. London, England, under the designation "Breon 1001" was shredded in a Banbury mixer for 20 minutes, then 10 parts of hexamethylenetetramine was added, and mixing was continued for 10 minutes. The rubber was formed into sheets and dissolved in ethyl methyl ketone. Then there was added with stirring a solution in ethyl methyl ketone of 100 parts of a phenol-formaldehyde novolac resin, "Cellobond H 833," and 5 parts of a phenol-formaldehyde novolac resin, "Cellobond H 832," both obtained from British Resin Products Ltd., Penarth, Glamorgan, Wales, the amount of ethyl methyl ketone being such that the solution contained about 20 percent by weight of solids. Next, a film about 0.025 mm thick was cast on release paper, and applied to carbon fibers, and the assembly was heated for 1 minute at 120°C under a pressure of 0.7 kg/sq.cm. The composite was cured by heating at 190°C for 30 minutes.

EXAMPLE IV

A resole resin was prepared in a conventional manner from 1 molar proportion of phenol, 1.43 molar proportions of formaldehyde, and 0.43 molar proportions of sodium hydroxide: it contained 70 percent by weight of resin-forming materials. This product (75 parts) was diluted with 25 parts of industrial methylated spirits, then 5 parts of hexamethylenetetramine and 0.05 parts of flake sodium hydroxide were added. Next, 45 parts of a soluble nylon obtained from E.I. du Pont de Nemours and Co., Inc., under the designation "Zytel 61" was added, and the whole dissolved in 450 parts of methanol. Films 0.025 mm thick were cast onto polythene strippable facing sheets, and one such film was applied to each face of a flat bundle of carbon fibers, the assembly being passed through nip rolls heated to 80°C. After the strippable sheets had been removed, the composite was cured by heating for 1 hour at 150°C under a pressure of 7 kg/sq.cm.

EXAMPLE V

Epoxide resin A (80 parts) and Epoxide resin F (80 parts) were heated at 150°C in a Z-blade mixer. (Epoxide resin F was a polyglycidyl ether prepared in a known manner by reaction of 2,2-bis(4-hydroxyphenyl) propane with epichlorohydrin in the presence of aqueous sodium hydroxide: it had a 1,2-epoxide content in the range 0.25 to 0.42 equiv./kg. and a softening point (Durrans) in the range 145° to 155°C) When the mixture had become homogeneous, it cooled to 100°C and a milled mixture comprising 20 parts of Epoxide resin A, 5 parts of a finely divided silica of large specific surface area, and 12 parts of dicyandiamide was incorporated. The mixture was cast into a film 0.1 mm thick and the film was applied to one face of a flat layer of carbon fibers by passage through loaded rollers heated at 80° to 100°C. Three such assemblies were laid on top of each other, aluminum foil 0.1 mm thick was laid on the top, and a second such foil was laid on the bottom face, of the stack. (The aluminum foil had previously been degreased and pickled as prescribed in British Ministry of Aviation Aircraft Process Specification DD-915B, washed in running water, and dried at room temperature) This mixed composite was heated for 1 hour at 170° C under a pressure of 7 kg/sq.cm. The aluminum foil adhered well to the carbon fiber-reinforced assembly.

Other mixed composites could be made by bonding under similar conditions assemblies in which such sheets of aluminum foil were interposed between sheets of carbon fibers impregnated with the film adhesive. Also, the sheets of unidirectional carbon fibers could be laid such that the fibers in successive sheets were in different orientations. Further, sheets of glass fibers or of woven glass cloth, impregnated with the film adhesive, could be substituted for some of the impregnated carbon fiber sheets.

EXAMPLE VI

Carbon fibers were held in place, essentially parallel to each other, on a film prepared from composition c as described in Example I, and the assembly was heated at 155°C for 1 minute under a nominal pressure. To the other face of the assembly was applied a film prepared as described in Example V, the assembly being passed through loaded rollers heated at 80° to 100°C. One sheet of this "prepreg" was placed on either face of a sheet of aluminum honeycomb core, the film prepared as described in Example V being in contact with the core. Then two further sheets of a carbon-fiber "prepreg" impregnated solely with composition c prepared as described in Example I were applied to either face of the "sandwich" assembly, and the whole was bonded by heating for 1 hour at 175°C under a pressure of 3.5 kg/sq.cm.

We claim:

1. A method for making a composite which comprises applying a continuous solid film of a thermosettable resin composition to unidirectional carbon fibers, applying heat and pressure so that the resin composition flows about the fibers, and the resin composition and the fibers form a coherent structure and converting the resin into its solid, fusible B-stage.

2. Method according to claim 1, wherein the resin is subsequently converting into a fully cured, insoluble, infusible C-stage product after the composite has been formed into any desired configuration.

3. Method according to claim 1 wherein a continuous film of a thermosettable resin composition is applied to one face of the carbon fibers and a continuous film of a different thermosettable resin composition is applied to another face of the carbon fibers.

4. Method according to claim 1, wherein the film of thermosettable resin composition is provided with a strippable backing sheet on the face opposite to that brought into contact with the carbon fibers.

5. Method according to claim 1, wherein the carbon fibers are laid on a continuous film of a thermosettable resin composition, then a second continuous film of a thermosettable resin composition is laid on top of the fibers and the assembly is pressed.

6. Method according to claim 1, wherein the composite is manufactured continuously, the carbon fibers being contacted on one face with a said continuous film of a thermosettable resin composition and a second continuous solid film of a thermosettable resin composition being applied to the reverse face of the fibers.

7. Method according to claim 6, wherein the composite is manufactured continuously, two such said continuous films of thermosettable resin composition being applied simultaneously to each face of the carbon fibers.

8. Method according to claim 1, wherein the continuous film contains a thermoplastic resin which is not heat-curable.

9. Method according to claim 8, wherein the said continuous film contains a resole and a poly(vinyl acetal) or a nylon.

10. Method according to claim 8 wherein the said continuous film contains a novolac and a neoprene rubber or an acrylonitrile rubber.

11. Method according to claim 8, wherein the said continuous film contains an epoxide resin and a thermoplastic resin which is a. a polyarylene polyhydroxy polyether, substantially free from 1,2-epoxide groups, being a copolymer of a dihydric phenol either with a diglycidyl ether of a dihydric phenol or with epichlorohydrin and contains recurring units represented by the formula

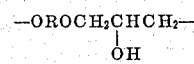

where R denotes an arylene group, or b. a polysulfone containing recurring units represented by the formula $-RSO_2-$, where R denotes an arylene group, or c. a copolymer of an α-olefin hydrocarbon with an α-olefin which is an ester of a carboxylic acid.

* * * * *